(12) United States Patent
Halterbeck et al.

(10) Patent No.: US 6,780,280 B2
(45) Date of Patent: Aug. 24, 2004

(54) PRESSING CUSHION

(75) Inventors: Walter Halterbeck, Duren (DE); Ralf Kaldenhoff, Aachen (DE)

(73) Assignee: Thomas Josef Heimbach Gesellschaft mit beschrankter Haftung & Co., Duren (DE)

(*) Notice: Subject to any disclaimer, the term of this patent is extended or adjusted under 35 U.S.C. 154(b) by 4 days.

(21) Appl. No.: 10/256,295

(22) Filed: Sep. 27, 2002

(65) Prior Publication Data

US 2003/0059576 A1 Mar. 27, 2003

(51) Int. Cl.⁷ ............................................. B30B 15/02
(52) U.S. Cl. .......................... 156/583.3; 156/583.1; 100/295; 442/229
(58) Field of Search ......................... 156/228, 580, 156/583.1, 583.3; 100/295; 139/420 R, 425 R; 442/228, 229, 238

(56) References Cited

U.S. PATENT DOCUMENTS

| | | | | |
|---|---|---|---|---|
| 5,120,597 A | * | 6/1992 | Takimoto et al. | 442/136 |
| 5,298,322 A | * | 3/1994 | Hennecken et al. | 442/229 |
| 5,855,733 A | * | 1/1999 | Douglas et al. | 156/583.1 |
| 6,413,889 B1 | * | 7/2002 | Best et al. | 442/305 |

FOREIGN PATENT DOCUMENTS

| | | |
|---|---|---|
| DE | 2 319 593 | 11/1974 |
| DE | 23 19 593 B | 9/1976 |
| DE | 297 21 494 U1 | 4/1998 |
| EP | 0 920 983 A1 | 10/1998 |
| EP | 1 040 909 A1 | 3/1999 |
| EP | 1 033 237 A1 | 6/2000 |
| WO | WO 93/18913 | 9/1993 |
| WO | WO 00/01522 | 9/1999 |

* cited by examiner

*Primary Examiner*—James Sells
(74) *Attorney, Agent, or Firm*—Liniak, Berenato & White, LLC

(57) ABSTRACT

A pressing cushion (1) for use in laminating presses has a textile support (2) with threads (3, 4, 5), at least some of which constitute thermally conductive threads (3, 4, 5) that bring about, either directly or by contact with other thermally conductive threads (3, 4, 5), a thermal transfer from one outer side to the other outer side of the pressing cushion (1). The support (2) includes a cushion layer (7) made of a flexible rubber material, wherein the thickness of the cushion layer (7) is less than that of the support (2). The cushion layer (7) is embedded into the support (2) in such a way that thermally conductive threads (4, 5) protrude beyond the cushion layer (7) on both outer sides of the pressing cushion (1).

32 Claims, 1 Drawing Sheet

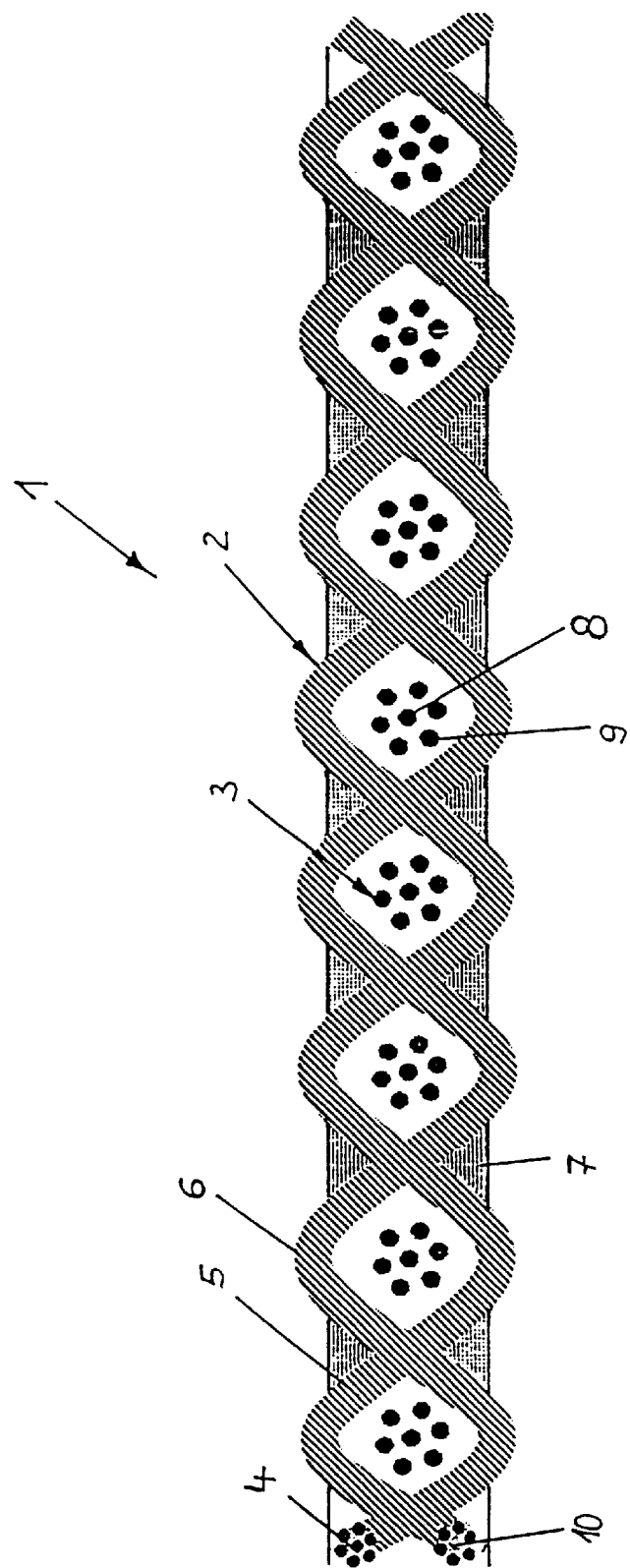

PRESSING CUSHION

The invention concerns a pressing cushion for use in laminating presses, having a textile support with threads, at least some of which constitute thermally conductive threads that bring about, either directly or by contact with other thermally conductive threads, a thermal transfer from one outer side to the other outer side of the pressing cushion, the support comprising a cushion layer made of a flexible rubber material.

The manufacture of layered materials, for example particle boards equipped with decorative laminates, is accomplished in laminating presses that can be configured as low- or high-pressure multi platen presses or short-cycle presses. Pressing cushions, whose purpose is to transfer pressure uniformly onto the pressed material over its entire surface, are utilized in this context. The pressing cushions must be able to withstand high pressures as well as the temperatures present in such pressing cushions, and they must be capable of transferring the heat proceeding from the press plates quickly and without major losses onto the pressed material, i.e. they must have high thermal conductivity in that direction.

Pressing cushions are generally textile products, and there are numerous different embodiments. The pressing cushion of the species as defined in DE-B-23 19 593 comprises a plain-weave metal fabric that is completely embedded in a cushion layer, made of a silicone elastomer, that constitutes a matrix. Additives, for example made of powdered copper and/or aluminum and/or aluminum bronze powder and/or graphite and/or ferrosilicon, can be mixed into the silicone elastomer in order to increase the thermal conductivity of the cushion layer.

This type of pressing cushion has proven successful because the cushion layer made of silicone elastomer is resistant to the temperatures present in laminating presses, which can exceed 200° C.; and because it has good long-term spring-back properties so that permanent impressions do not occur (this is also called "windowing" because of the shape of the panels being pressed). A further advantage is the fact that the threads of the support are physically immobilized by the cushion layer, and the pressing cushion thus has good dimensional stability.

In order to increase productivity, efforts are being directed toward shorter and shorter cycle times in laminating presses. This requires rapid thermal transfer from the heating plates to the pressed material, i.e. the pressing cushions must have high thermal conductivity in the thickness direction.

The known pressing cushion does not satisfactorily meet these criteria despite the presence of the metal woven fabric and the additives that promote thermal conductivity. It is thus the object of the invention to configure a pressing cushion of the kind cited initially in such a way that it is also suitable for laminating presses with short cycle times, i.e. in particular, guarantees rapid thermal transfer from the heating plates to the pressed material.

According to the present invention, this object is achieved by a pressing cushion in which the thickness of the cushion layer is less than that of the support, and the cushion layer is embedded into the support in such a way that thermally conductive threads protrude beyond the cushion layer on both outer sides of the pressing cushion. The fundamental idea of the invention is thus to allow the thermally conductive threads to protrude beyond the cushion layer at least partially on both outer sides of the pressing cushion, i.e. on its flat sides, thus creating a direct (and, under press pressure, planar) contact with the heating plates on the one hand and the pressing sheets on the other hand. It has been found that thermal transfer in the thickness direction can thereby be substantially accelerated. By way of the number and thickness of the thermally conductive threads, and in particular the contact areas, the thermal conductivity in the thickness direction can be optimally adapted in accordance with particular requirements. It has been found, surprisingly, that despite the reduction in the thickness of the cushion layer, the cushioning behavior has not changed disadvantageously but in fact has improved. The ability of the pressing cushion to act in a pressure-equalizing fashion, and thus to transfer the press pressure uniformly over the surface, has not been impaired. No "windowing" was observed.

Since the cushion layer will as a rule be thinner than in the case of the pressing cushion described in DE-B-23 19 593, a material saving is achieved with the pressing cushion according to the present invention, and it is not inconsiderably lighter. The pressing cushion is thus more economical to manufacture and transport. Its handling is also simpler.

To allow the pressing cushion to be used even at high temperatures, the flexible rubber or elastomer material should be resistant up to at least 200° C., better still 240° C. Eligible flexible rubber materials are preferably those that retain their elasticity properties over the long term at the pressures and temperatures that exist in laminating pressures. Synthetic elastomers, for example silicone elastomers, fluoroelastomers, and/or fluorosilicone elastomers, are especially suitable therefor. The flexible rubber material should preferably have a hardness in the range from 60 to 85 Shore A.

In order to obtain the best possible cushioning capability, the cushion layer should, in a manner known per se, be embedded in gap-filling fashion into the support, preferably centeredly, i.e. symmetrically. The possibility of an asymmetrical arrangement also exists, however.

Here as well, as known from the existing art, the possibility exists of incorporating filler materials into the cushion layer for various purposes. In order to reduce the weight of the pressing cushion, filler materials whose specific weight is less than that of the flexible rubber material can be distributed in the cushion layer. Gas bubbles (so that the cushion layer has a foamed character), powders, fibers, and/or microspheres are suitable for this. Instead of or in combination with these, it is also possible to incorporate thermally conductive particles, whose specific thermal conductivity is greater than that of the cushion layer, into the cushion layer. Powders or fibers made of metals or carbon are suitable for this purpose. The proportion of optionally present filler materials and optionally present thermally conductive particles should amount to 10 to 60 wt % of the weight of the cushion layer.

The cushion layer itself should constitute 15 to 40 wt %, preferably 20 to 35 wt %, of the weight of the entire pressing cushion. By way of differing weight proportions, the cushioning capability of the pressing cushion can be adapted to the particular requirements. The thickness of the pressing cushion should preferably be in the range from 0.75 to 3 mm.

The thermally conductive threads need not go back and forth between the outer sides of the cushion, although such an embodiment is preferred. Good thermal conductivity is in fact also achieved if a system of thermally conductive threads is present on both sides of the pressing cushion and the thermally conductive threads protrude there, and if said thermally conductive threads have a connection to one another in the cushion layer, for example are interwoven with one another.

As regards the number of contact points, it is proposed according to the present invention to provide 10 to 40 contact points per square centimeter. Altogether, the contact points of the thermally conductive threads on the outer sides of the pressing cushion should occupy 15 to 30% of each respective surface. These values guarantee very good thermal conductivity in the thickness direction.

The thermally conductive threads can be made of metals, in particular of highly thermally conductive metals such as, for example, copper, brass, aluminum, silver, or even an alloy thereof. Thermally conductive threads made of carbon and/or a combination of metal and carbon are also eligible. By way of the selection of the material for the thermally conductive threads, and their quantity, thickness, and arrangement, the thermal conductivity of the pressing cushion in the thickness direction can be optimally adapted to the particular requirements.

As a special instance, the thermally conductive threads can comprise a core thread that has at least one wire or ribbon wound around it or around which are spun wires or ribbons, which are made of a material whose specific thermal conductivity is greater than that of the core thread. Thermally conductive threads of this kind are evident, for example, from DE-U-297 21 494.

As in the case of the pressing cushion defined in DE-B-23 19 593, the support can be configured to consist entirely of thermally conductive threads, i.e. for example of a pure metal woven fabric. As an alternative to this, the possibility exists of providing further threads in addition to the thermally conductive threads in order to impart desired properties to the pressing cushion. The further threads can constitute plastic threads that have a temperature resistance of at least 200° C., preferably 240° C. Aromatic polyamides (aramids) are eligible in particular for this purpose.

With regard to the configuration of the threads (both the thermally conductive threads and the further threads), essentially no limitations are imposed. The threads can thus be configured as monofilaments, multifilaments, braided threads, fiber yarns, strands, cables, ribbons, twisted yarns, raveled yarns, and/or wrapped yarns.

Provision is further made according to the invention for the support to comprise electrically conductive threads that bring about, either directly or by contact with other electrically conductive threads, an electrical conductivity between the outer sides of the pressing cushion. The static electricity which forms in laminating presses can be dissipated through electrically conductive threads of this kind. Since the materials for the thermally conductive threads usually are also electrically conductive, the electrically conductive threads can at least partially also constitute thermally conductive threads, so that the mere presence of the thermally conductive threads and their protrusion beyond the cushion layer also ensures dissipation of the static electricity.

The support is preferably configured as a continuous planar textile structure, the embodiment as a woven fabric being principally eligible. Other textile thread structures are also eligible, however, for example knitted fabrics, woven thread fabrics, or woven or knitted spacer fabrics. If the support is embodied as a woven fabric, it has proven advantageous if the weft threads extend substantially in a straight line and the warp threads form externally protruding bends, and if the latter at least partially constitute the thermally conductive threads. The height of the bends of the warp threads can be adjusted by way of the diameter of the warp and weft threads. For example, an increase in the bend height can be achieved by enlarging the warp thread diameter and reducing the weft thread diameter. It is understood that the thermal conductivity can be adjusted by way of the type of fabric weave and the thread thickness. Multiple-ply fabrics can also be used in this context.

In a further embodiment of the invention, provision is made for threads which comprise recesses that were created by the removal of thread-like components to be present, and for the material of the cushion layer to fill up the recesses. A better positive interlock between the cushion layer and threads is thereby achieved. Manufacture can be accomplished in such a way that first the support is manufactured and then the thread-like components are dissolved out by means of a solvent that dissolves them or by being burned out; and only then is the cushion layer introduced, for example by means of a ductor process. The recesses can also be created by removal of a core thread. Eligible materials for the thread-shaped components are cotton, viscose staple fiber, polyvinyl alcohol, polyethylene, polypropylene, polyamide, polyacrylonitrile, polyester, or other readily soluble or low-melting substances.

Lastly, the invention provides for the pressing cushion to have passages that are open between the outer sides of the pressing cushion, so that the pressing cushion is permeable in the thickness direction. The passages can be constituted, for example, by dissolved-out threads or thread components and/or by pores in the cushion layer.

BRIEF DESCRIPTION OF THE DRAWINGS

The invention is illustrated in more detail, with reference to an exemplary embodiment, in the drawing, which shows a portion of a pressing cushion 1 in vertical section.

Pressing cushion 1 comprises a textile support 2 that is configured as a plain-weave fabric. Support 2 has weft threads (labeled 3 by way of example) extending perpendicular to the drawing plane and substantially in a straight line. Weft threads 3 are engaged into warp threads 4, 5 that alternate between weft threads 3 and the sides of the pressing cushion, and form bends (labeled 6 by way of example) respectively above and below weft threads 3.

A cushion layer 7 made of a silicone elastomer extends symmetrically with respect to the center plane of pressing cushion 1. The thickness of cushion layer 7 is less than the total thickness of pressing cushion 1, which is defined by warp threads 4, 5. The latter's bends 6 protrude on both outer sides of pressing cushion 1. During use in a laminating press, bends 6 are in direct contact on the one hand with the hot pressing plates and on the other hand with the pressing sheets, forming contact surfaces which grow larger under pressure. Since warp threads 4, 5 continuously change sides, they form thermally conductive threads that transfer heat from the hot pressing plates to the pressing sheets and thus to the pressed material. Weft threads 3 and the thermally conductive particles incorporated into cushion layer 7 also promote thermal transfer.

Weft threads 3 comprise a core thread 8 made of an aromatic polyamide, around which metal wires (labeled 9 by way of example) are wound. Warp threads 4, 5 are configured in the same way, but the core thread is removed from every other warp thread 5, for example by treatment with an appropriate solvent or by being burned out. The silicone elastomer of cushion layer 7 penetrates into cavity 10 thus created, thereby improving the bond between support 2 and cushion layer 7.

What is claimed is:

1. A pressing cushion (1) for use in laminating presses, having a textile support (2) with threads (3, 4, 5), at least some of which constitute thermally conductive threads (3, 4,

5) that bring about, either directly or by contact with other thermally conductive threads (3, 4, 5), a thermal transfer from one outer side to the other outer side of the pressing cushion (1), the support (2) comprising a cushion layer (7) made of a flexible rubber material, wherein the thickness of the cushion layer (7) is less than that of the support (2), and the cushion layer (7) is embedded into the support (2) in such a way that thermally conductive threads (4, 5) protrude beyond the cushion layer (7) on both outer sides of the pressing cushion (1).

2. The pressing cushion as defined in claim 1, wherein the flexible rubber material is resistant up to at least 200° C.

3. The pressing cushion as defined in claim 1, wherein the flexible rubber material is an elastomer.

4. The pressing cushion as defined in claim 3, wherein the elastomer is a silicone elastomer, fluoroelastomer, and/or fluorosilicone elastomer.

5. The pressing cushion as defined in claim 1, wherein the flexible rubber material has a hardness in the range from 60 to 85 Shore A.

6. The pressing cushion as defined in claim 1, wherein the cushion layer (7) is embedded in gap-filling fashion in the support (2).

7. The pressing cushion as defined in claim 1, wherein the cushion layer (7) is embedded centeredly in the support (2).

8. The pressing cushion as defined in claim 1, wherein the cushion layer (7) constitutes 15 to 40 wt % of the weight of the pressing cushion (1), preferably 20 to 35 wt %.

9. The pressing cushion as defined in claim 1, wherein the thickness of the pressing cushion (1) is 0.75 to 3 mm.

10. The pressing cushion as defined in claim 1, wherein filler materials whose specific weight is less than that of the flexible rubber material are distributed in the cushion layer (7).

11. The pressing cushion as defined in claim 10, wherein the filler materials comprise gas bubbles, powders, and/or microspheres.

12. The pressing cushion as defined in claim 1, wherein thermally conductive particles whose specific thermal conductivity is greater than that of the cushion layer (7) are distributed in the cushion layer (7).

13. The pressing cushion as defined in claim 12, wherein the thermally conductive particles are embodied as powders and/or fibers made of metal and/or carbon.

14. The pressing cushion as defined in claim 10, wherein the proportion of optionally present filler materials and optionally present thermally conductive particles amounts to 10 to 60 wt % of the weight of the cushion layer (7).

15. The pressing cushion as defined in claim 1, wherein thermally conductive threads (4, 5) alternate back and forth between the outer sides of the pressing cushion (1).

16. The pressing cushion as defined in claim 1, wherein the thermally conductive threads (4, 5) on the outer sides of the pressing cushion (1) constitute 10 to 40, preferably 15 to 30, contact points per square centimeter.

17. The pressing cushion as defined in claim 1, wherein thermally conductive threads (4, 5) on the outer sides of the pressing cushion (1) form contact points whose areas occupy 15 to 30% of each respective surface of the pressing cushion (1).

18. The pressing cushion as defined in claim 1, wherein thermally conductive threads are made of metals, for example copper, brass, aluminum, silver or alloys thereof, of carbon, and/or of combinations of metal and carbon.

19. The pressing cushion as defined in claim 1, wherein thermally conductive threads (3, 4, 5) comprise a core thread that has at least one wire or ribbon wound around it or around which are spun wires or ribbons which are made of a material whose specific thermal conductivity is greater than that of the core thread.

20. The pressing cushion as defined in claim 1, wherein the support (2) consists of thermally conductive threads (3, 4, 5).

21. The pressing cushion as defined in claim 1, wherein further threads are present in addition to the thermally conductive threads.

22. The pressing cushion as defined in claim 21, wherein the further threads constitute plastic threads that have a temperature resistance of at least 200° C.

23. The pressing cushion as defined in claim 1, wherein the threads (3, 4, 5) are configured as monofilaments, multifilaments, braided threads, fiber yarns, strands, cables, ribbons, twisted yarns, raveled yarns, and/or wrapped yarns.

24. The pressing cushion as defined in claim 1, wherein the support (2) comprises electrically conductive threads (3, 4, 5) that bring about, either directly or via contacts with other electrically conductive threads (3, 4, 5), an electrical conductivity between the outer sides of the pressing cushion (1).

25. The pressing cushion as defined in claim 24, wherein the electrically conductive threads (3, 4, 5) at least partially also constitute thermally conductive threads (3, 4, 5).

26. The pressing cushion as defined in claim 1, wherein the support (2) is configured as a woven fabric, knitted fabric woven thread fabric, or woven or knitted spacer fabric.

27. The pressing cushion as defined in claim 1, wherein the support (2) is embodied as a woven fabric in which weft threads (3) extend substantially in a straight line and the warp threads (4, 5) form eternally protruding bends (6) and at least partially constitute the thermally conductive threads.

28. The pressing cushion as defined in claim 27, wherein the weft threads exist in at least one ply.

29. The pressing cushion as defined in claim 1, wherein threads which comprise recesses that were created by the removal of thread-like components are present; and the material of the cushion layer (7) fills up the recesses.

30. The pressing cushion as defined in claim 29, wherein the recesses were created by removal of a core thread.

31. The pressing cushion as defined in claim 1, wherein the pressing cushion (1) has passages that are open between the outer sides.

32. The pressing cushion as defined in claim 31, wherein the passages are formed by pores.

* * * * *